United States Patent
Davis

[15] 3,696,849
[45] Oct. 10, 1972

[54] FOOD CHOPPER
[72] Inventor: William E. Davis, 10309 South Indian River Drive, Fort Pierce, Fla. 33450
[22] Filed: Aug. 7, 1970
[21] Appl. No.: 62,038

[52] U.S. Cl. ................................146/146 R, 30/304
[51] Int. Cl. ..........................B26d 3/26, B26d 1/26
[58] Field of Search............146/146, 147, 203, 78 A; 30/304, 303

[56] References Cited
UNITED STATES PATENTS

| | | |
|---|---|---|
| 2,458,090 | 1/1949 | Miller....................146/203 X |
| 2,520,790 | 8/1950 | Wesik......................146/146 R |
| 2,735,467 | 2/1956 | Hellmich................146/146 R |

*Primary Examiner*—Willie G. Abercrombie
*Attorney*—Elizabeth Newton Dew and Dew and Dew

[57] ABSTRACT

A chopper for vegetables and like materials includes a board or base to which one end of a cutting blade assembly is universally pivoted. The assembly includes a main straight cutting blade and a dicer blade which is pivoted to the straight blade for selective pivoting either to a position of use in cooperation with the main blade, or to inactive position within the handle part of the main blade.

9 Claims, 5 Drawing Figures

PATENTED OCT 10 1972 3,696,849
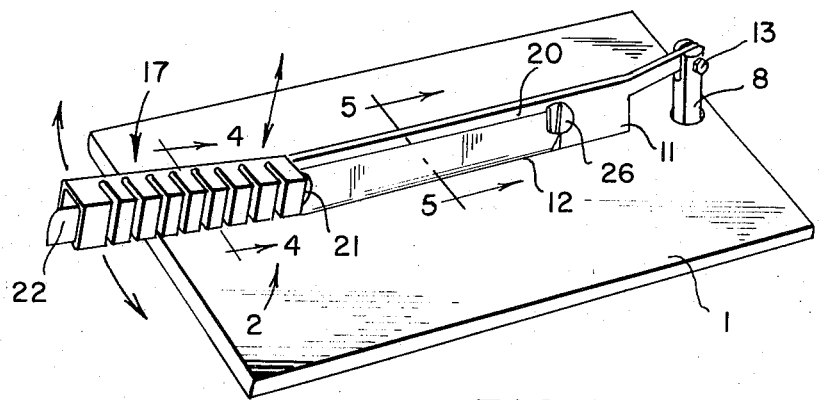
FIG. 1
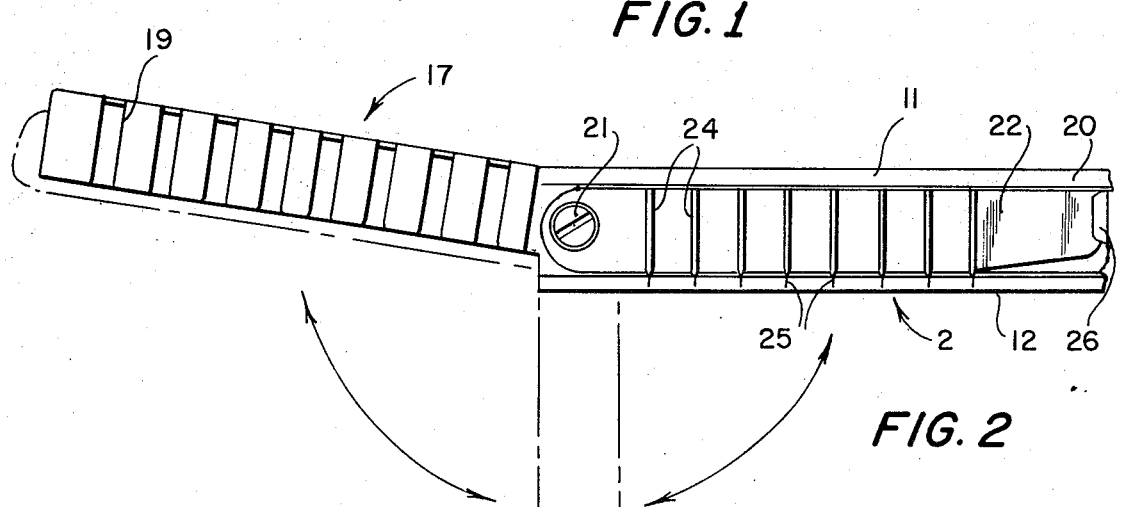
FIG. 2
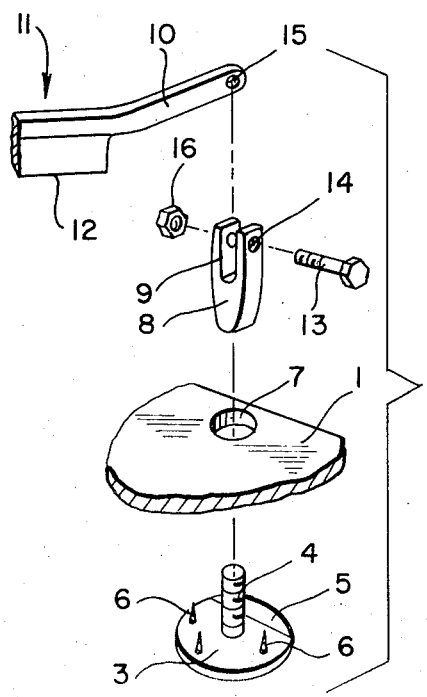
FIG. 3
FIG. 5  FIG. 4
INVENTOR
WILLIAM E. DAVIS
BY Elizabeth Newton Dew
ATTORNEY

FOOD CHOPPER

This invention relates to devices for the comminution, slicing or dicing of edible substances such as fruits and vegetables, and other materials.

The chief purposes of the invention are to provide an implement of the nature aforesaid which is highly versatile and practical for use in comminuting and dicing, which is safe, convenient and easy to use and clean, easily constructed in mass production at relatively low cost per unit, and a general advance in the art of slicing, dicing and comminuting.

In the drawing:

FIG. 1 is a perspective view of the entire apparatus, showing the dicer blade in inactive position pivoted within the implement handle;

FIG. 2 is a view to an enlarged scale of the handle and dicer blade with the latter pivoted to its position of use in cooperation with the main blade;

FIG. 3 is an exploded perspective showing in detail the joint universally pivoting the blade assembly to its base or board;

FIG. 4 is a cross section taken in a plane identified by line 4 — 4, FIG. 1; and FIG. 5 is a cross section through the main blade, normal to the longitudinal axis thereof, as indicated by line 5 — 5, FIG. 1.

Referring in detail to the drawing, 1 identifies a cutting board of wood or plastic, to which is universally pivoted a blade assembly generally identified at 2. FIG. 3 in particular shows the pivoted mounting to include a metal plate 3 conveniently round and having one end of a threaded stud 4 rigidly fixed thereto, as by welding, threading or upsetting. In order to permit the pivot axis of the blade assembly to be located closely adjacent one edge of the board 1, the plate may be cut away or turned upwardly along a chord thereof, as indicated at 5. When the chordal portion is thus turned upwardly as shown, the parts are so proportioned and disposed that this portion fits snugly within a correspondingly shaped depression in the contiguous edge of the board so that it lies essentially flush or coplanar with the board's edge. Plate 3 is provided with a number, shown as three, of regularly angularly spaced holes through which screws 6 pass into the lower face of the board.

Stud 4 passes upwardly through a hole 7 of larger diameter than the stud. A yoke 8 has a bore extending upwardly from its lower end, and which is threaded onto the upper end of stud 4. The yoke is easily rotatable on the stud and may be thus vertically adjusted as desired for effecting correct collocation of the cutting edges of the blade assembly, with respect to the upper surface of the board. Yoke 8 has a vertical slot 9 in its upper end, sized to receive with a smooth fit, the end 10 of a main straight cutting blade 11 forming a part of assembly 2, and having its lower edge sharpened as indicated at 12. A pivot bolt 13 passes with a smooth fit through horizontally aligned holes 14, 15 in the upper forked end of yoke 8 and blade end 10, respectively, and is held in operating position by nut 16 threaded onto its end. By the construction just described, blade assembly 2 may in addition to the vertical adjustment previously mentioned, be swung horizontally over and with respect to board 1 and also pivoted in any selected vertical plane.

Blade 11 terminates at its free end in a hollow or tubular handle generally identified at 17, FIGS. 1 and 2. From FIG. 4 in particular it is noted that the handle may consist of a sheet of stiff metal bent into the general cross sectional form of a hollow square with its edges spaced at and longitudinally along its lower surface to define a slot 18. The top, bottom, and outer side walls only of the handle thus formed are provided with kerfs or slots 19 spaced along its length and shown upon the drawing as eight in number. It will be understood however that more or less than eight kerfs may be provided in correspondence with the number of cutting edges of the dicer blade subsequently described. Each slot 19 lies essentially in a respective plane normal to the longitudinal axis of the handle; and it will be noted especially from FIGS. 1 and 2 that this axis is inclined at an acute angle upwardly with respect to the longitudinal axis of main blade 11 or, more especially, with respect to its cutting edge 12. As shown upon FIG. 5, main blade 11 is of heavy gage metal and has a reinforced upper edge 20.

The unslotted inner side wall of handle 11 is rigidly joined to the contiguous end of blade 11 as by welding or brazing. At about this junction the blade is pierced with a hole for the reception of a pivot screw 21 on which one end of a dicer blade 22 is mounted. This dicer blade comprises, referring more particularly to FIG. 4, of a stiff strap-like metallic back 23 to which are rigidly attached as by welding or brazing, a plurality of knives 24 corresponding in number and spacing to the slots 19 in handle 17. Still referring to FIG. 4 it is noted that each blade, all of which may be duplicates, is generally triangular in shape and is attached along one vertical side of the triangle to backing strap 23. Further, each dicer blade is sharpened along its horizontally disposed edge as indicated at 25, FIGS. 2 and 4.

The parts are so dimensioned and proportioned that when dicer blade 22 is pivoted to its operating position shown at FIG. 2, all cutting edges 25 thereof extend essentially at right angles to, and lie essentially horizontally coplanar with cutting edge 12 of main blade 11. Further, in such operating position each cutting edge 25 has one end closely adjacent the cutting edge 12 so that there is thus formed an array of cutting edges comprising edge 12 and a plurality of edges 25 extending outwardly at right angles therefrom and coplanar therewith. Thus when assembly 2 is pivoted downwardly about bolt 13 into contact with board 1, all cutting edges are essentially in contact with this board.

As indicated by the arrows of FIG. 2, blade 22 may be pivoted downwardly about the axis of screw 21, then upwardly to a position wherein, as depicted at FIG. 4, each blade 24 moves into handle 17 through a respective slot therein, to a second position wherein all blades 24 are fully housed and protected within the handle so that their cutting edges 25 lie therewithin and cannot inflict injury to anyone grasping the handle.

Movement of dicer blade 22 to its aforesaid first or operating position is determined and limited by contact of its presently upper edge with the outwardly extending reinforcement 20 of main blade 11, as is clear from inspection of FIG. 2. A short holding screw 26 is threaded with a snug fit into a hole in blade 11, near the pivoted end thereof. This screw has a large head which is spaced from the blade by a distance about equal to the thickness of blade 22. The parts are so dimensioned that as blade 22 is pivoted about screw 21 into its operating position, its free end fits snugly beneath the head of screw 26 and is thereby frictionally and releasably held in such position.

When blade 22 is pivoted downwardly from its operating position of FIG. 2 and moved into handle 17, each blade 24 moves freely into a respective slot 19 thereof, as previously described, to the position indicated at FIG. 4. While the adjustable friction at pivot 21 is ordinarily sufficient to hold blade 22 in the inactive position within the handle, it is contemplated that catch or detent means not shown, may be provided between the strap or back 23 and a contiguous portion of the handle, at the outer ends thereof, to positively but releasably hold the dicer blade within the handle.

The operation and use of the implement is generally clear from the foregoing description. When it is desired to perform straight slicing of materials such as meats, fruits or vegetables, blade 22 is pivoted about its axis defined by screw 21, to the position wherein knives 24 are housed within handle 17. If the cutting edge of blade 11 when moved fully downwardly, is not parallel or essentially coplanar with the surface of the board, it is easily adjusted to such position by turning it, with yoke 8 so that the latter moves upwardly or downwardly, as the case may be, and thus effects the desired adjustment as the yoke rises or descends along the stud 4. When it is desired to perform dicing or comminuting, blade 22 is pivoted out of handle 17 into its position shown upon FIG. 2 wherein, in cooperation with blade 11 its knives 24 operate at each downward stroke, to make an equal number of cuts. Dicing or comminuting are thereby greatly speeded up. The entire blade assembly is readily detached from board 1 merely by turning it about stud 4. When thus detached the assembly is easily washed and cleaned. Numerous other ways of use of the implement will readily occur to the user after a brief period of experience.

Many modifications and substitutions of equivalents will readily occur to those skilled in the art, after a study of the foregoing description. For instance, the number and spacing of knives 24 may be varied. Such spacing for any given implement may progressively vary from one end of the blade to the other, to thus provide cuts of varying sizes.

Having fully disclosed the invention, what I claim and desire to secure by Letters Patent is:

1. A food slicer comprising, a first cutter blade having an essentially straight cutting edge, a second cutter blade having a plurality of cutter knives extending outwardly therefrom, and means mounting said second blade on said first blade for movement from a first position wherein the cutting edges of said knives are in cooperative cutting relation with the cutting edge of said first blade, to a second position out of cooperative cutting relation therewith.

2. The slicer of claim 1, said knives when in said cooperative cutting relation, each extending outwardly at about right angle from the cutting edge of said first blade, essentially coplanar therewith.

3. The slicer of claim 2, each said knife when in said cooperative cutting relation, having one end closely adjacent the cutting edge of said first blade.

4. The slicer of claim 1, a hollow handle fixed to one end of said first cutter blade, said handle being provided with a plurality of slots in spaced relation therealong, said mounting means comprising a pivot connecting one end of said second blade to said first blade, each said knife moving into said handle for enclosure therewithin, through a respective one of said slots, when said second blade is moved to its said second position.

5. The slicer of claim 4, a cutter board, and pivot means universally connecting the end of said first blade remote from said handle, to said board.

6. The slicer of claim 5, said pivot means being adjustable to effect vertical adjustment of the pivoted end of said first blade, with respect to the cutting area of said board.

7. The slicer of claim 4, said hollow handle being essentially rectangular in transverse section and having a longitudinal slot in its lower wall, in the plane of said second blade, said pivot being at the juncture of said first blade and handle, the radial distance from the axis of said pivot to the cutting edge of each said knife, being equal to the distance from said pivot of each respective one of said slots.

8. The slicer of claim 1, each said cutter knife being generally triangular, sharpened along one edge of the triangle, and rigidly attached to said first cutter blade along a second side of the triangle.

9. The slicer of claim 1, said mounting means comprising a pivot, a headed element fixed to said first blade, between the ends thereof and remote from said pivot, the free end of said second blade entering beneath the head of said element when said second blade is moved into its said first position for releasably retaining the same therein, said first blade having a reinforcement shoulder parallel with and spaced from its cutting edge, the contiguous edge of said second blade, when in said first position, contacting said shoulder.

* * * * *